(No Model.)

W. VONDERSAAR.
HORSESHOE.

No. 260,260. Patented June 27, 1882.

WITNESSES.
Chas. N. Leonard.
Chas. L. Thurber.

INVENTOR.
Wendel Vondersaar,
PER
C. Bradford,
ATTORNEY.

UNITED STATES PATENT OFFICE.

WENDEL VONDERSAAR, OF INDIANAPOLIS, INDIANA.

HORSESHOE.

SPECIFICATION forming part of Letters Patent No. 260,260, dated June 27, 1882.

Application filed March 28, 1882. (No model.)

*To all whom it may concern:*

Be it known that I, WENDEL VONDERSAAR, of the city of Indianapolis, county of Marion, and State of Indiana, have invented certain new and useful Improvements in Horseshoes, of which the following is a specification.

My said invention consists in constructing a horseshoe with sets of spurs, each of said spurs being constructed integrally therewith, the inner spur of each set being adapted to enter the bottom of the hoof a short distance, and the outer spur of each set being adapted to be clinched over upon the outside of the hoof, thus gripping a portion of the substance of the hoof between the two spurs, all as will hereinafter be more particularly shown and described.

I am aware that shoes have been constructed with clips and spurs of various kinds and fastened in various manners. I am not aware that any shoe has, however, been produced embodying all the features of my invention or which was at once so secure and inexpensive.

Figure 1:
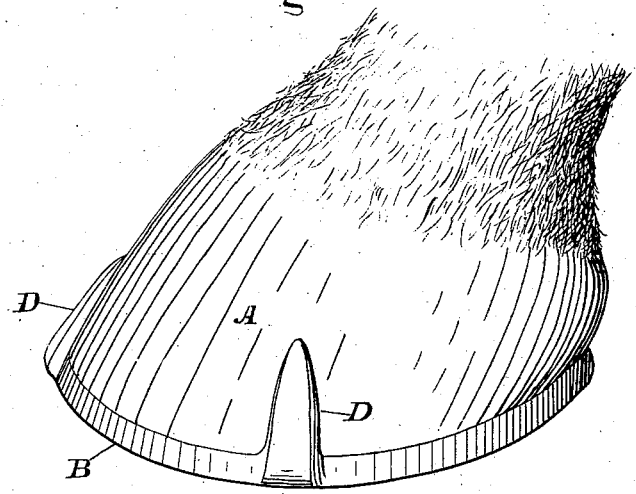
Figure 2:
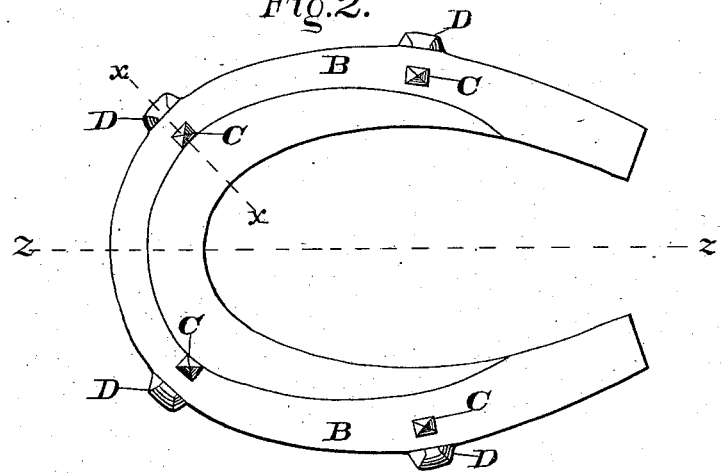
Figure 3:
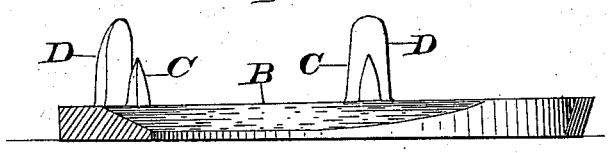
Figure 4:
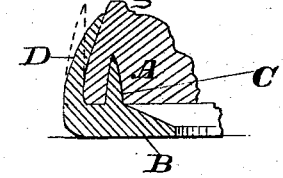

Referring to the accompanying drawings, which are made a part hereof, and on which similar letters of reference indicate similar parts, Figure 1 is a perspective view of a horse's foot with a shoe secured thereon in accordance with my improvements; Fig. 2, a plan view of a shoe embodying said improvements; Fig. 3, a sectional view of the same as seen from the dotted line $zz$; and Fig. 4, a view on the dotted line $xx$, showing a small section of the hoof and shoe, and illustrating the method of fastening the shoe to the hoof.

In said drawings, the portions marked A represent the hoof of the animal; B, the body of the shoe; C, spurs on said shoe, which are intended to enter the hoof, and D spurs around the outer edge of the shoe, which are intended to close down upon the hoof after the shoe is applied, and thus hold it in position. The spurs C occupy the same position continuously. The spurs D occupy the positions shown in Figs. 2 and 3 and by the dotted lines in Fig. 4 before the shoe is used, but are clinched or closed down upon the hoof in the position shown in Fig. 1 and by the full lines in Fig. 4 when the shoe is applied to the hoof.

The method of using my improved shoe is as follows: The hoof is prepared to receive a shoe, and the shoe is constructed of suitable form to fit the hoof in substantially the usual manner. The shoe is then lightly driven onto the hoof, the short spurs C entering the same in substantially the same manner as ordinary nails, though not nearly so far. The horse is preferably then allowed to bear his weight upon the foot being operated upon, which brings the hoof and shoe closely together. The spurs D are then clinched or closed down, as shown, and the shoeing is complete. By the use of this invention much of the labor incident to the shoeing of horses as usually performed is avoided, and, what is most important, the hoof of the horse is preserved in much better condition.

In case of horses which "interfere," three sets of my spurs only are used, and if the animal is a large one it may be found necessary to use one nail in place of the omitted set of spurs.

As will be readily seen, a portion of the substance of the hoof is gripped between the two spurs, and a tearing loose of the shoes is thus rendered impossible.

Having thus fully described my said invention, what I claim as new, and desire to secure by Letters Patent, is—

A horseshoe, B, provided with sets of spurs C D, all constructed integrally therewith, and arranged as shown, said spurs C being adapted to enter the bottom of the hoof a short distance, and said spurs D being adapted to be clinched down upon the outside of the hoof, and thus grip a portion of the substance of the hoof directly between the two spurs, in the manner shown and specified.

In witness whereof I have hereunto set my hand and seal at Indianapolis, Indiana, this 25th day of March, A. D. 1882.

WENDEL VONDERSAAR. [L. S.]

In presence of—
C. BRADFORD,
CHAS. L. THURBER.